United States Patent [19]

Bodine

[11] Patent Number: 4,652,309

[45] Date of Patent: Mar. 24, 1987

[54] SONIC METHOD AND APPARATUS FOR HEAP LEACHING

[76] Inventor: Albert G. Bodine, 7877 Woodley Ave., Van Nuys, Calif. 91406

[21] Appl. No.: 874,535

[22] Filed: Jun. 16, 1986

[51] Int. Cl.⁴ .............................................. C22B 3/00
[52] U.S. Cl. ....................................... 75/101 R; 75/2; 366/108; 366/128; 366/600; 422/127; 422/128; 204/193; 266/101; 266/114; 266/134; 266/166
[58] Field of Search ............... 366/128, 118, 600, 108; 422/127, 128; 75/2, 101 R; 423/1, 659; 266/101, 114, 134, 168; 204/193

[56] References Cited

U.S. PATENT DOCUMENTS

| | | | |
|---|---|---|---|
| 3,525,606 | 8/1970 | Bodine | 422/127 |
| 4,017,309 | 4/1977 | Johnson | 75/101 R |
| 4,168,295 | 9/1979 | Sawyer | 423/659 |
| 4,526,615 | 7/1985 | Johnson | 75/101 R |
| 4,556,467 | 12/1985 | Kuhn et al. | 204/193 |
| 4,566,800 | 1/1986 | Bodine | 366/128 |

Primary Examiner—John Doll
Assistant Examiner—Robert L. Stoll
Attorney, Agent, or Firm—Edward A. Sokolski

[57] ABSTRACT

A liquid impervious covering such as a plastic membrane or a concrete flooring is installed over an extensive substantially level area of ground and mined metal ore heaped onto this covering to form a mound. A leachant liquid solution is poured onto the ore and permitted to thoroughly penetrate the ore material. This end result is achieved either by forming a crater on the top of the ore material which is filled with the leachant solution which is allowed to ooze through the ore material, or by feeding the solution from sprinklers located around the mound until the ore material is thoroughly wetted. When the ore material has been wetted with the leachant, sonic energy is applied to the ore material by means of a sonically excited elastic pipe or bar member which is lowered into the mound by means of a crane and sonically driven by means of an orbiting mass oscillator. The sonic energy fluidizes the mound causing the leachant to thoroughly penetrate the ore material so that the metal salt in the ore is thoroughly dissolved in such leachant and separated from the parent earthen material.

15 Claims, 3 Drawing Figures

SONIC METHOD AND APPARATUS FOR HEAP LEACHING

SPECIFICATION

This invention relates to the leaching of metal from ore and more particularly to a method and apparatus which utilizes sonic energy to implement this end result. The leaching or extraction of metal from ore as is well known in the art involves the utilization of a leachant solution in which the metal salt in the ore is dissolved. The metalic material contained in the leaching solution is then separated from the solution to obtain the desired end product. It has been found that leaching action can be greatly enhanced by applying sonic energy to the ore material while it is being penetrated by the leaching solution such as described in my U.S. Pat. Nos. 3,525,606 and 4,566,800. This end result can be achieved with the ore and leachant contained in a tank into which a bar or tube member is inserted, this bar or tube member being sonically driven by means of an orbiting mass oscillator. While these prior art methods and apparatus have been found to be quite efficient in enhancing the leaching action, the processing in a tank limits the quantity of ore that can be processed at a time. The method and apparatus of the present invention is an improvement over that of my aforementioned prior art patents in that it enables the leaching of large volumes of mined ore which are spread out over an area on the ground (typically an acre or more).

In carrying out the present invention a liquid impervious covering with may be in the form of a plastic membrane or a concrete floor is first installed over the area to be employed for carrying out the leaching process. The ore material is then heaped onto this covering in the shape of a mound. The mound of ore material is then wetted with the leaching solution either by forming a crater in the top of the mound into which the solution is poured and allowed to ooze through the ore material, or by employing a sprinkler system surrounding the mound to wet the ore with the leachant. With the ore material wetted with the leachant, sonic energy is applied to such material by means of a tube or bar member which is lowered into the mound from a crane and sonically driven by means of an orbiting mass oscillator, preferably at a frequency which effects resonance standing wave vibration of the bar or tube member. The sonically excited bar or tube member is successively placed in different portions of the mound until the entire mound of ore material has been stirred and fluidized to effect thorough mixing with the leachant.

It is therefore an object of this invention to facilitate the leaching of large volumes of mined ore material.

It is a further object of this invention to provide a method and apparatus employing sonic energy to enhance the leaching of a large mount of ore material heaped on the ground.

Other objects of the invention will become apparent as the description proceeds in connection with the accompanying drawings of which:

Figure 1A:
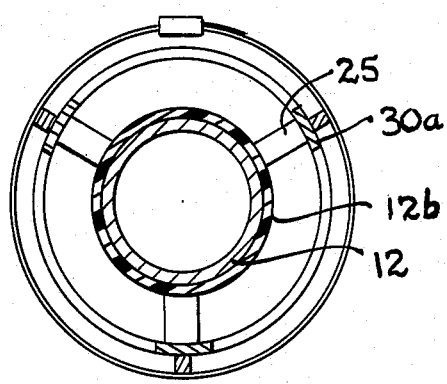
FIG. 1A is a cross sectional view taken along the plane indicated by plane 1A—1A in FIG. 1.
Figure 1:
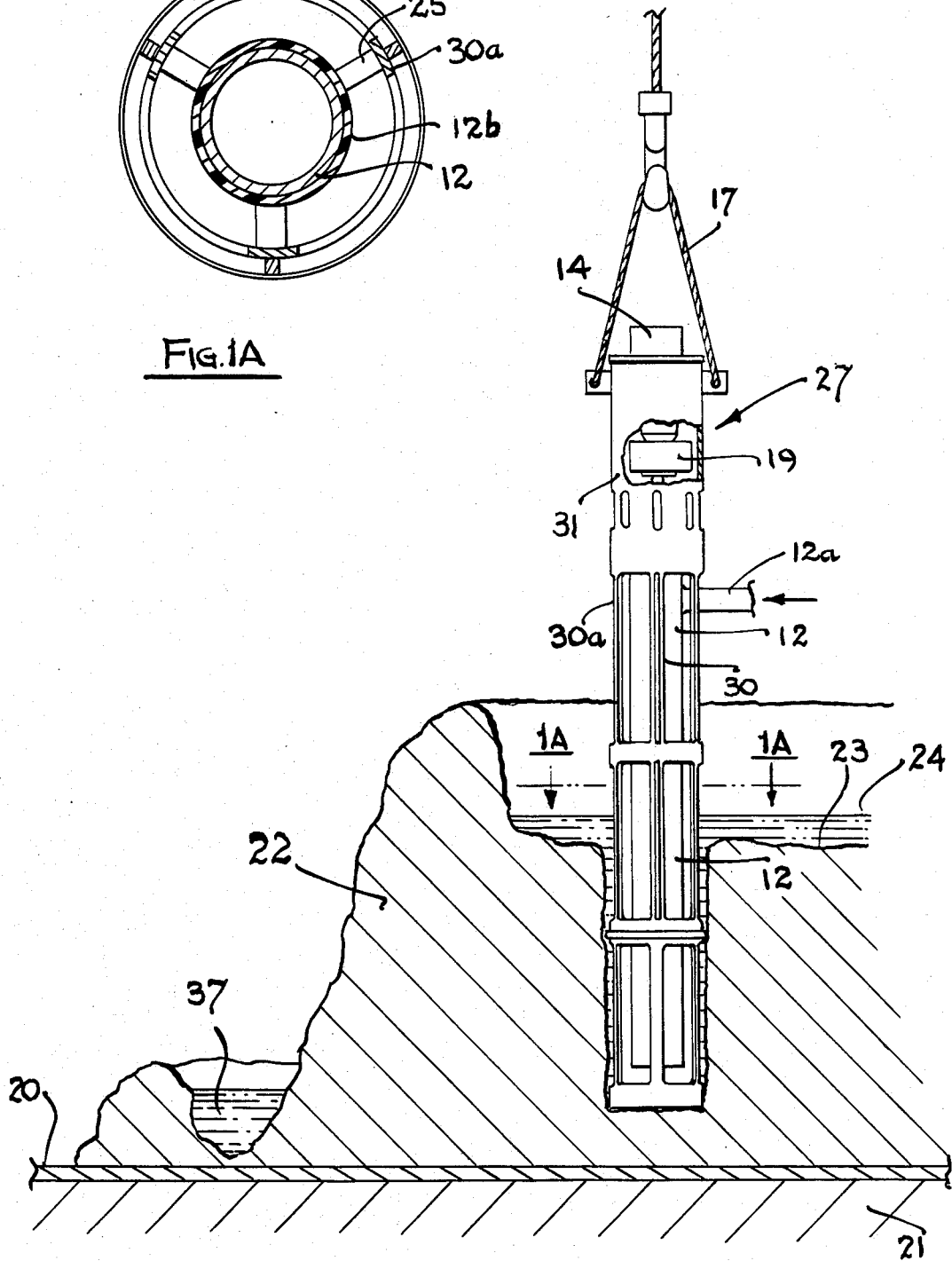
FIG. 1 is schematic illustration of a first embodiment of the invention.

Referring now to FIGS. 1 and 1A, the first embodiment of the invention is illustrated. The first embodiment employs a sonic excitation device generally similar to that described in connection with FIG. 4 of my U.S. Pat. No. 4,566,800 the disclosure of which is incorporated herein by reference.

An area of ground 21 which may be about an acre is covered with a liquid impervious covering 20 which may be in the form of a plastic membrane or a concrete base, a catchment gutter 37 being formed around this covering. A mound of mined metal ore material 22 is heaped onto the covering 20, a crater 23 being formed in the top of this mound. A leaching solution is poured into the crater 23 to form a lake 24, the leaching solution being permitted to peneterate and thoroughly wet the ore material. A sonic drive device 27 which is suspended from a crane on cables 17 is lowered into the ore material 22 so that it penetrates to near the bottom of the mound. Sonic drive device 27 has an elongated elastic tube member 12 which may be of steel which is sonically driven by means of an orbiting mass oscillator 19 in a lateral mode of vibration as described in my aforementioned U.S. Pat. No. 4,566,800, preferably at a resonant frequency as to fluidize the ore material and thoroughly mix the leachant therewith. After the sonic energy has been applied to one area of the mound, sonic device 27 is withdrawn from that section and installed in another section, this operation being repeated successively until the entire mound has been sonically simulated. Also the sonic drive device 27 can be moved sidewise in the mound while it is being sonically excited.

Tube member 12 has an inlet pipe 12a through which additional leaching solution can be fed to the ore material if need be to accelerate the penetration of the leachant. The sonic drive device 27 may be of the type described in connection with FIG. 4 of my aforementioned U.S. Pat. No. 4,566,800, utilizing an open lattice structure 30 formed in housing 31 by means of slats 30a with an orbiting mass oscillator 19 mounted in the housing, this oscillator being rotatably driven by motor 14. Tube member 12 which is sonically driven by oscillator 19 is centered within the housing by means of resilient posts 25 which are attached to and extend inwardly from the lattice structure 30. As in the device of my U.S. Pat. No. 4,566,800, the surface of tube member 12 is coated with a resilient material 12b.

Figure 2:
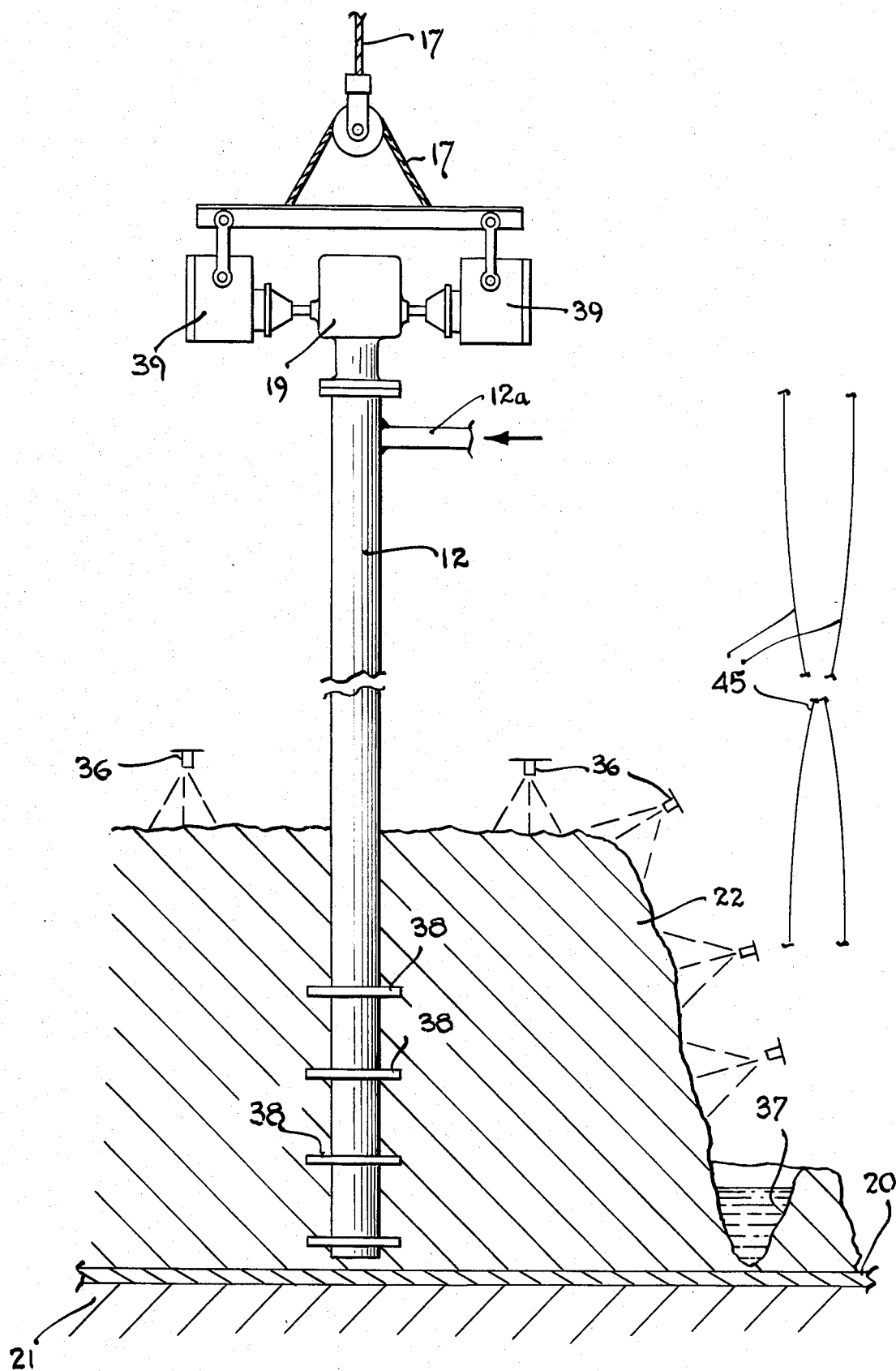
FIG. 2 is a side elevational view of a second embodiment of the invention.

Referring now to FIG. 2, a second embodiment of the invention is shown. In this second embodiment, rather than forming a crater in the top of the mound of ore material 22, the leaching solution is rather mixed with the ore by means of sprinklers 36 which surround the mound. In this embodiment, a pipe member 12 having a pluality of radial protuberances in the form of circular flanges 38 extending therefrom is employed to transfer the sonic energy to the ore material. Pipe member 12 as for the previous embodiment has an inlet 12a for adding additional leachant if this be required. Pipe member 12 is supported from and attached to an orbiting mass oscillator 19 which is rotatably driven by a pair of motors 39. The entire structure is supported by a crane by means of cables 17 as in the previous embodiment and is utilized in the same fashion as described in connection with the previous embodiment in providing sonic energy to various portions of the mound of ore material. The oscillator 19 and motor drive 39 may be of the type described in my U.S. Pat. No. 3,291,227 which is incorporated herein by reference for the portion of the disclosure relating thereto. Oscillator 19 is driven at a frequency such as to set up longitudinal resonance standing wave vibration of pipe member 30 as indicated by graph lines 45.

The apparatus and method of the invention thus enables the large scale leaching of mineral ore material employing sonic energy to enhance the leaching process.

While the invention has been described and illustrated in detail, it is to be clearly understood that this is intended by way of illustration and example only and is not to be taken by way of limitation, the spirit and scope of the invention being limited only by the terms of the following claims:

I claim:

1. A method for leaching metal ore material,
   placing a liquid impervious covering over a flat area of ground,
   heaping said ore material onto said covering,
   thoroughly wetting said ore material with a leaching solution,
   inserting an elastic column into said mound, and
   applying sonic energy to said column so as to fluidize the ore material and thoroughly mix the ore material with the leaching solution.

2. The method of claim 1 and additionally including the step of successively inserting said elastic column into different portions of said ore material to thoroughly sonically excite all of said material.

3. The method of claim 1 wherein the elastic column is moved sidewise in said material while being sonically driven.

4. The method of claim 1 wherein the ore material is wetted with the leaching solution by heaping said ore material into a mound, forming a crater in the top of said mound and filling said crater with the leaching solution, said solution running from said crater with the ore material.

5. The method of claim 1 wherein the ore material is wetted with the leaching solution by sprinkling said material with the solution with a sprinkler system.

6. The method of claim 1 wherein the sonic energy is applied to said column from an orbiting mass oscillator, said oscillator being operated at a frequency such as to effect resonant standing wave vibration of the column.

7. The method of claim 1, wherein said column has a plurality of protuberances extending radially from said column to increase the effective contact area of the column with said ore material.

8. The method of claim 4 wherein additional leaching solution is supplied to the ore material by feeding said additional solution into the crater through a pipe.

9. A system for leaching ore material heaped on ore area of ground comprising,
   a liquid impervious covering placed over said ground area on which the ore material is heaped,
   a column member,
   means for wetting said ore material with a leaching solution,
   an orbiting mass oscillator coupled to said column member,
   means for selectively positioning said column member in said ore material at various locations therein, and
   means for driving said oscillator at a frequency such as to effect resonant standing wave vibration of said column member,
   sonic energy being transferred to said ore material to fluidize said material and thoroughly mix said material with the leaching solution.

10. The system of claim 9, wherein the means for removably positioning said column member in said ore material comprises crane means for placing said column member successively in different portions of the material.

11. The system of claim 9 wherein said oscillator effects a lateral mode of vibration of said column member.

12. The system of claim 9 wherein said oscillator effects a longitudinal mode of vibration of said column member.

13. The system of claim 9 and further including radial flanges extending from said column member to increase the effective contact area of the column member with the ore material.

14. The system of claim 9 wherein the means for wetting the ore material comprises sprinkler means surrounding said material for dispensing the leaching solution onto said material.

15. The system of claim 9 wherein said column member is tubular, the means for wetting the ore material comprising said column member and means for feeding leaching solution to said tubular column member.

* * * * *